(12) United States Patent
Morita

(10) Patent No.: US 11,334,520 B2
(45) Date of Patent: May 17, 2022

(54) COMMUNICATION APPARATUS CAPABLE OF TRANSFERRING SELECTED DATA ITEM, METHOD FOR CONTROLLING THE SAME AND NON-TRANSITORY COMPUTER-READABLE STORAGE MEDIUM

(71) Applicant: CANON KABUSHIKI KAISHA, Tokyo (JP)

(72) Inventor: Hiroyasu Morita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 16/828,220

(22) Filed: Mar. 24, 2020

(65) Prior Publication Data

US 2020/0311024 A1 Oct. 1, 2020

(30) Foreign Application Priority Data

Mar. 25, 2019 (JP) .............................. JP2019-057090

(51) Int. Cl.
*G06F 16/11* (2019.01)
*G06F 16/25* (2019.01)
*H04L 67/06* (2022.01)

(52) U.S. Cl.
CPC .......... *G06F 16/122* (2019.01); *G06F 16/252* (2019.01); *H04L 67/06* (2013.01)

(58) Field of Classification Search
CPC ........ G06F 16/11; G06F 16/22; G06F 16/122; G06F 16/235; H04L 67/06

USPC ........................................................ 707/822
See application file for complete search history.

(56) References Cited

U.S. PATENT DOCUMENTS

| 6,275,825 | B1* | 8/2001 | Kobayashi | ............ G06F 21/604 |
| | | | | 705/52 |
| 9,348,761 | B1* | 5/2016 | Cummins | ............. G06F 3/0605 |
| 2003/0025930 | A1* | 2/2003 | Tateyama | ................ H04L 12/12 |
| | | | | 358/1.14 |
| 2009/0197575 | A1* | 8/2009 | Degraeve | ............ H04L 29/1216 |
| | | | | 455/412.1 |
| 2011/0271324 | A1* | 11/2011 | Ikeda | ..................... H04L 63/08 |
| | | | | 726/3 |

(Continued)

FOREIGN PATENT DOCUMENTS

JP 2012-147357 A 8/2012

*Primary Examiner* — Shahid A Alam
(74) *Attorney, Agent, or Firm* — Cowan, Liebowitz & Latman, P.C.

(57) ABSTRACT

A communication apparatus comprises a communication unit, a control unit which records transfer management information representing a state of a data item selected, from a plurality of data items stored in a storage, as a transfer target to be transferred to a destination apparatus, wherein the control unit updates the transfer management information in accordance with a process for transferring a data item, wherein the control unit, for a data item that has failed to be transferred by the communication unit, updates the transfer management information to a state indicating waiting for re-transfer, and when a destination apparatus is changed after the update, updates the transfer management information from the state indicating waiting for re-transfer to a state indicating not to transfer.

7 Claims, 6 Drawing Sheets

(56) References Cited

U.S. PATENT DOCUMENTS

2014/0002679 A1\* 1/2014 Ikeda ................. H04N 5/23264
348/208.5

\* cited by examiner

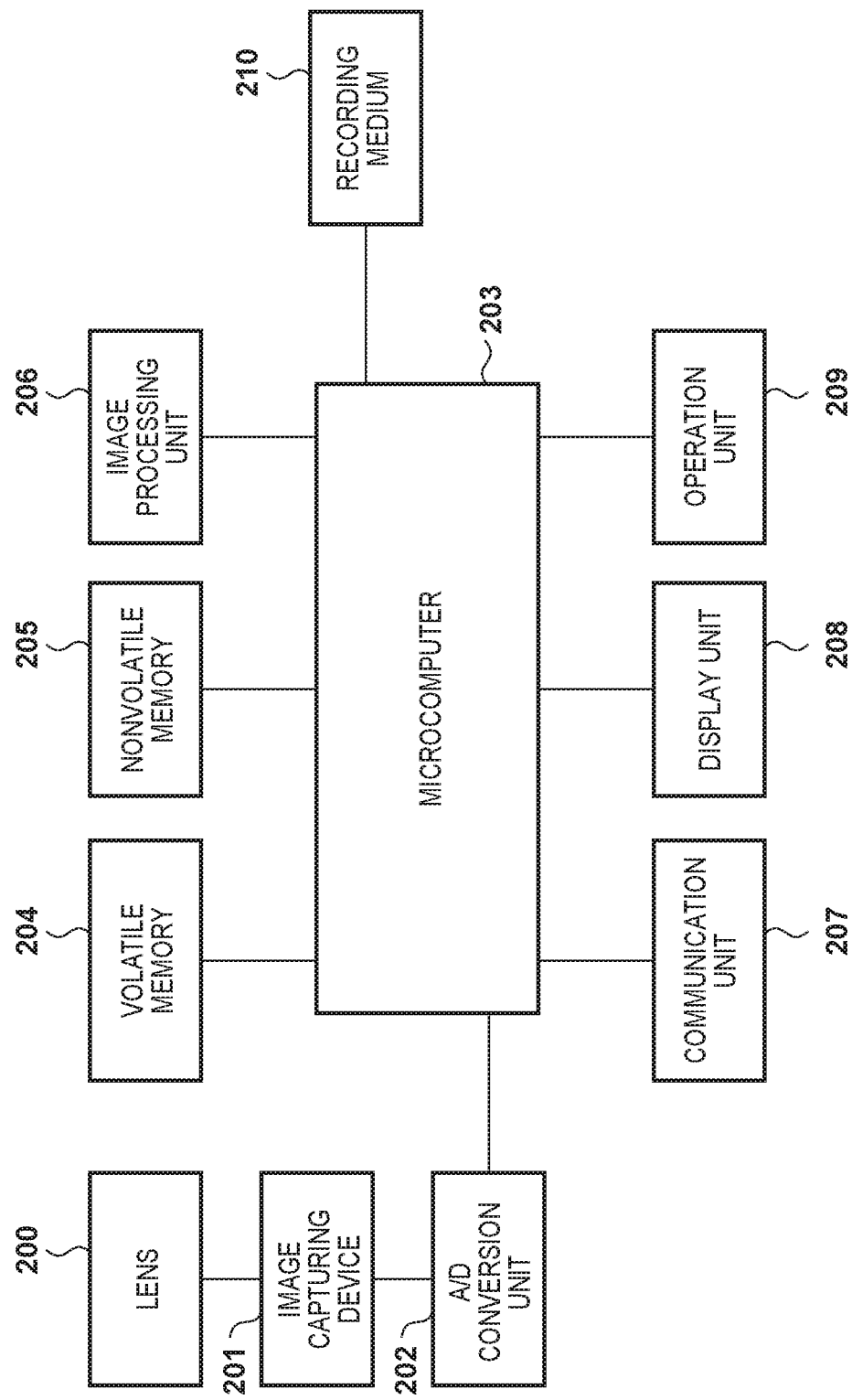

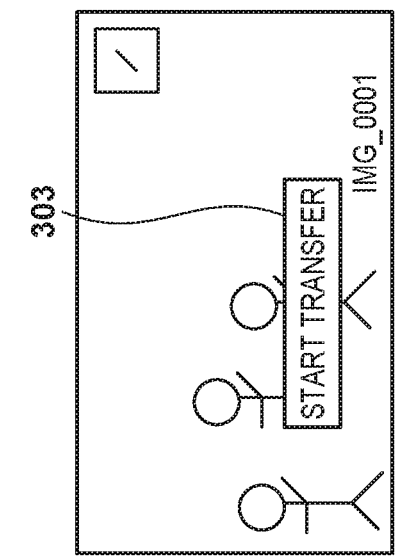
FIG. 3A
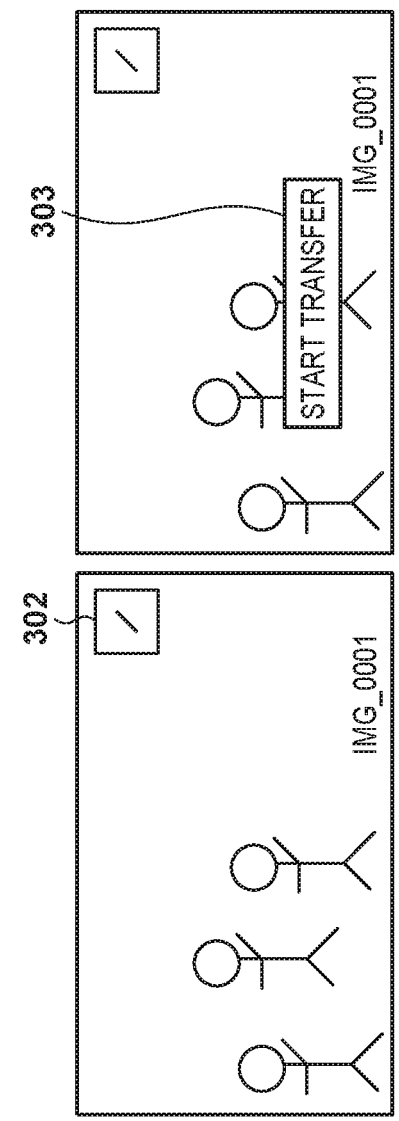
FIG. 3B
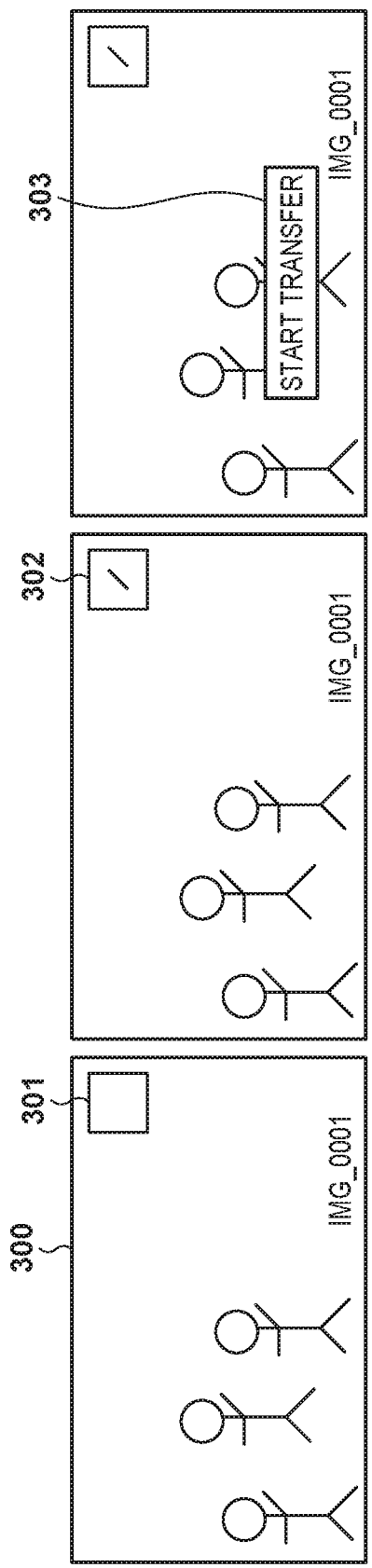
FIG. 3C
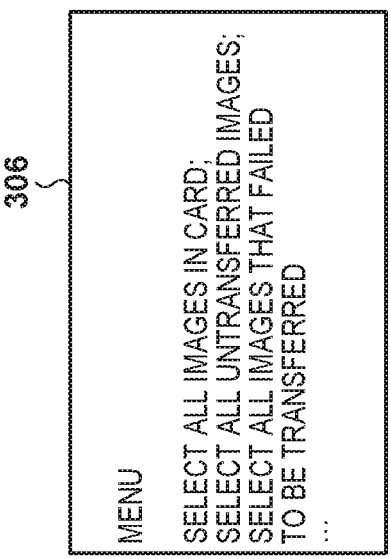
FIG. 3D
FIG. 3E
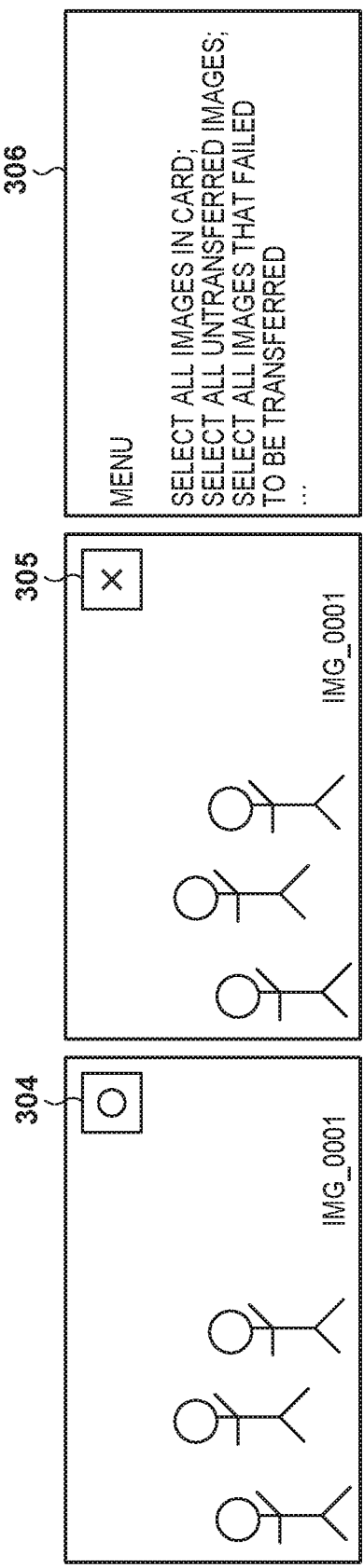
FIG. 3F

FIG. 4A

IMG_0001: "SELECTED" STATE;
IMG_0002: "SELECTED" STATE;
IMG_0003: "SELECTED" STATE

FIG. 4B

IMG_0001: "WAITING FOR TRANSFER" STATE;
IMG_0002: "WAITING FOR TRANSFER" STATE;
IMG_0003: "WAITING FOR TRANSFER" STATE

FIG. 4C

IMG_0001: "TRANSFER IN PROGRESS" STATE;
IMG_0002: "WAITING FOR TRANSFER" STATE;
IMG_0003: "WAITING FOR TRANSFER" STATE

FIG. 4D

IMG_0001: "TRANSFER COMPLETED" STATE;
IMG_0002: "WAITING FOR TRANSFER" STATE;
IMG_0003: "WAITING FOR TRANSFER" STATE

FIG. 4E

IMG_0001: "TRANSFER COMPLETED" STATE;
IMG_0002: "TRANSFER IN PROGRESS" STATE;
IMG_0003: "WAITING FOR TRANSFER" STATE

FIG. 4F

IMG_0001: "TRANSFER COMPLETED" STATE;
IMG_0002: "WAITING FOR RE-TRANSFER" STATE;
IMG_0003: "WAITING FOR RE-TRANSFER" STATE

FIG. 4G

IMG_0001: "TRANSFER COMPLETED" STATE;
IMG_0002: "WAITING FOR TRANSFER" STATE;
IMG_0003: "WAITING FOR TRANSFER" STATE

FIG. 4H

IMG_0001: "TRANSFER COMPLETED" STATE;
IMG_0002: "TRANSFER COMPLETED" STATE;
IMG_0003: "TRANSFER COMPLETED" STATE

FIG. 4I

IMG_0001: "TRANSFER COMPLETED" STATE;
IMG_0002: "TRANSFER FAILED" STATE;
IMG_0003: "TRANSFER FAILED" STATE

F I G. 5

```
[COMMUNICATION FUNCTION MENU EXAMPLE]
Set1: FTPServer_A WIRED LAN XXX VIA ACCESS POINT;
Set2: FTPServer_B WIRED LAN XXX VIA ACCESS POINT;
Set3: FTPServer_A WIRELESS LAN XXX VIA ACCESS POINT;
Set4: FTPServer_A WIRED LAN YYY VIA ACCESS POINT;

INITIALIZE WIRELESS COMMUNICATION SETTINGS
```

COMMUNICATION APPARATUS CAPABLE OF TRANSFERRING SELECTED DATA ITEM, METHOD FOR CONTROLLING THE SAME AND NON-TRANSITORY COMPUTER-READABLE STORAGE MEDIUM

BACKGROUND OF THE INVENTION

Field of the Invention

The present invention relates to a communication apparatus, a method for controlling the same, and a non-transitory computer-readable storage medium.

Description of the Related Art

Conventionally, there are image capturing apparatuses that, in conjunction with an increase in network transfer speeds, transfer captured images to an external device using a network, regardless of whether the image is transferred automatically or manually. It is also possible for a user to connect an image capturing apparatus and an FTP server, to select an image captured by the image capturing apparatus, and to transfer the selected image to the FTP server. There is a mechanism by which, when image transfer fails, image re-transfer is automatically performed. For example, if there is an image that could not be transferred due to the disconnection of a wireless connection during the FTP transfer, the image capturing apparatus automatically re-transfers the image that could not be transferred when the image capturing apparatus is connected to the FTP server again.

For example, Japanese Patent Laid-Open No. 2012-147357 discloses a technique related to control for, in cases where a network error occurs and there is an image that failed to be transferred, automatically re-transferring the image that failed to be transferred by increasing the number of triggers for checking whether or not there has been a recovery from a network error.

However, the FTP server to which the image capturing apparatus is connected again after the image transfer fails is not necessarily the same as the FTP server to which the image capturing apparatus is connected when the image transfer fails. That is, in the conventional automatic re-transfer mechanism, there is a possibility that the image capturing apparatus automatically transfers the image to an FTP server which is not intended by the user. In addition, the communication method for transfer is not limited to wireless communication, and the same problem exists even in the case of wired communication.

SUMMARY OF THE INVENTION

The present invention was made in consideration of such problems, and provides a technique for easily transferring a data item that has failed to be transferred to an external device to the external device in accordance with the intention of a user.

According to an aspect of the invention, there is provided a communication apparatus, comprising: a communication unit configured to communicate with an external device via a network; a storage unit configured to store a plurality of data items; a managing unit configured to manage transfer management information representing a state of a data item selected, from the plurality of data items stored in the storage unit, as a transfer target to be transferred to a transfer destination apparatus by the communication unit; and a control unit configured to control the managing unit so that the transfer management information is updated in accordance with a process for transferring a data item, wherein the control unit, by controlling the managing unit, for a data item that has failed to be transferred by the communication unit, updates the transfer management information to a state indicating waiting for re-transfer in which, after recovery to a state in which transfer is possible, a re-transfer is performed by the communication unit to the transfer destination apparatus, and when a transfer destination apparatus is changed after the update, updates the transfer management information so as to be changed from the state indicating waiting for re-transfer to a state indicating not to transfer.

According to the present invention, it is possible to easily transfer a data item that has failed to be transferred to an external device to the external device in accordance with the intention of the user, and to suppress transfer to an unintended device.

Further features of the present invention will become apparent from the following description of exemplary embodiments (with reference to the attached drawings).

BRIEF DESCRIPTION OF THE DRAWINGS

FIG. 2 is a block diagram of an image capturing apparatus to which the embodiment is applied.

FIGS. 3A-3F are display examples of selection of images to be transferred.

FIGS. 4A-4I are transition diagrams of an image transfer management state in the present invention.

FIG. 5 is a display example of a transfer destination setting menu.

DESCRIPTION OF THE EMBODIMENTS

Figure 1A:
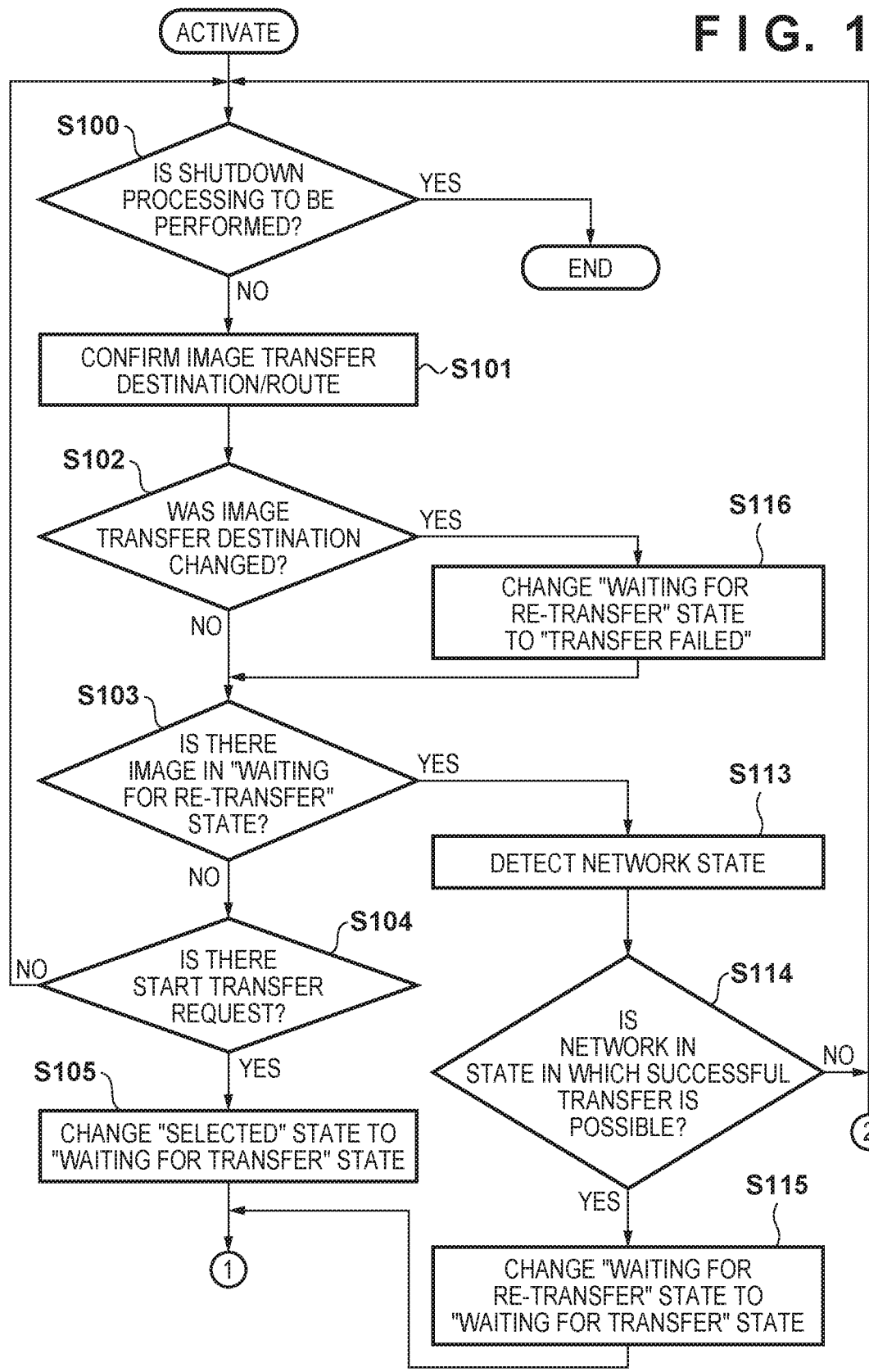
FIGS. 1A and 1B are flowcharts of a transfer process according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIG. 2 is a configuration diagram of an image capturing apparatus according to the present embodiment. The image capturing apparatus includes an image capturing lens 200, an image capturing device 201, an A/D conversion unit 202, a microcomputer 203, a volatile memory 204, a nonvolatile memory 205, an image processing unit 206, a communication unit 207, a display unit 208, an operation unit 209, and a recording medium 210.

The image capturing lens 200 may be a single focus lens or a zoom lens. The image capturing device 201 is configured by a CCD or a CMOS sensor, and converts a subject image formed on the surface of the image capturing lens 200 into electrical signals. The A/D conversion unit 202 converts an analog output signal of the image capturing device 201 into a digital signal.

The microcomputer 203 performs control of the entire image capturing apparatus such as control of respective components and data processing. For example, when a user operates the operation unit 209, the operation unit 209 notifies the microcomputer 203 of a signal corresponding to the operation. The microcomputer 203 performs various types of processing according to the signal, for example, generation of an image to be displayed on the display unit 208, network control via the communication unit 207, and the like. The microcomputer 203 also performs processing such as selection of an image to be transferred, management of an image that failed to be transferred, automatic re-transfer, and the like, which will be described in the present embodiment. In addition, the microcomputer 203 performs control for setting a transfer destination server, control for powering off and on the image capturing apparatus, control for detecting a network state, and the like.

The volatile memory (RAM) 204 is used for temporarily holding image data converted into a digital signal by the A/D conversion unit, or as a work area of the microcomputer 203. The nonvolatile memory 205 (rewritable memory such as a flash memory) stores various programs and parameters to be executed by the microcomputer 203, and various sating values in the image capturing apparatus.

The image processing unit 206 performs image process-ing on the captured image. The image processing includes development processing such as demosaicing processing, encoding processing, and the like.

The communication unit 207 is an interface for perform-ing communication with an external device. The communi-cation unit 207 is assumed to include a wired connection and a wireless connection, but may include either of these. Both a wired LAN (Ethernet (registered trademark) interface) and a wireless LAN (IEEE 802.11x:x includes a, b, g, n, and ac) can be used in embodiments. Although the communication protocol in the embodiment is assumed to be for FTP transfer, other protocols may be used.

The display unit 208 is configured by a liquid crystal display device or the like, and is controlled by the micro-computer 203 to display various menus, captured images, and the like. Selection of an image to be transferred, display indicating the selected image, and the display of various messages indicating an image that failed to be transferred are performed via the display unit 208.

The operation unit 209 includes various switches, buttons, a touch panel, and the like. This includes a switch for switching on and off a power source, a switch for instructing a shooting operation, and the like.

By operating the operation unit 209, the user can give various instructions to the image capturing apparatus (the microcomputer 203), For example, when the user selects target items from various menus displayed on the display unit 208, the operation unit 209 is also used.

The recording medium 210 is, for example, a CF card, and can store a plurality of image files. Under the control of the microcomputer 203, image data captured by the image capturing device 201 is temporarily stored in the volatile memory 204 and encoded by the image processing unit 206. Then, the microcomputer 203 records the encoded image data as a file on the recording medium 210. At the time of reproduction, the microcomputer 203 reads encoded data into the volatile memory 204, and the image processing unit 206 performs decoding processing under the control of the microcomputer 203. Then, the microcomputer 203 outputs the decoded image data to the display unit 208.

First, an outline for the selection of an image to be transferred and transfer failure in the embodiment in the above configuration will be described.

Exemplary screen displays of the display unit 208 accord-ing to a process for selecting an image to be transferred are shown in FIGS. 34-3F, The following description will be given on the assumption that the captured image file "IMG_0001.jpg" is stored in the recording medium 210.

Reference numeral 300 in FIG. 3A indicates a state in which an image stored in the recording medium 210 is displayed on the display unit 208. The microcomputer 203 after detecting a reproduction instruction to the operation unit 209 by a user reads out an image file from the recording medium 210, controls the image processing unit 206 to decode the image file, and displays the decoded image on the display unit 208. In the lower part of the display screen, the file name "IMG_0001.jpg" is displayed superimposed on the captured image, so that the user can confirm the displayed file name. Reference numeral 301 denotes a region that is displayed superimposed on the captured image and is used to notify a transfer management state of the image.

Image transfer management in the embodiment will now be described. Transfer management means the management of transfer-related states in association with an image, such as whether the image is a transmission target, whether the image has already been transferred, and whether the image has failed to be transferred.

For example, when the user selects that the image be transferred via the operation unit 209 in the display state 300, a "selected" state is managed in the transfer manage-ment. A symbol "/" is displayed in the region 300 as indicated by reference numeral 302 in the FIG. 3B to display an indication of the "selected" transfer management state. In this state, when the user operates the operation unit 209 to select to transfer the image, the microcomputer 203 executes transmission of the image in the "selected" state to a transfer destination. More specifically, in response to the selection of the image, the microcomputer 203 displays a superimposi-tion of an explicit start transfer button 303 on the screen as shown in FIG. 3C. Then, the microcomputer 203 starts the transfer upon detection of the pressing of the start transfer button 303. The transfer may be started using the setting of the selected state as a trigger. Any transfer start timing and conditions may be used.

When, after the transfer is started by the operation of the start transfer button 303, the transfer is completed, the microcomputer 203 manages the image with the "trans-ferred" transfer management state. In order to make it easy for the user to distinguish the transferred image from other images, the microcomputer 203 of the embodiment marks the region 300 with a symbol "○" as indicated by reference numeral 304 in the FIG. 3D when displaying a transferred image on the display unit 208.

An image that failed to be transferred will also be described. Assume that when the start transfer button 303 is pressed to start the transfer process and thereby transfer the selected image to the transfer destination, a network error or the like occurs and the image cannot be successfully sent to the transfer destination. In this case, the microcomputer 203 manages the transfer of the image as having failed. As a result, when the image is re-displayed on the display unit 208, a symbol "x" is shown in the region 300 as indicated by reference numeral 305 in the FIG. 3E, and the user is thereby notified of the failure of the transfer. Incidentally, the user can return an image to a non-selected state by selecting the region 300 and performing a state initialization input instruction (the state in FIG. 3A).

Although the explanation thus far has described transfer-ring a single image displayed on the display unit 208, a menu such as the screen 306 in FIG. 3F may be displayed, and a user may be allowed to select a plurality of images at once by displaying an option therefor that the user can select. For example, when "select all the images in the card" in the menu is selected, the microcomputer 203 sets all the images recorded in the recording medium 210 to the selected state (the state marked by "/" in reference numeral 302). When "select all of the untransferred images" is selected, the microcomputer 203 sets the images, excluding the images managed as having been transferred, among all the images recorded on the recording medium 210 to the selected state. Then, when "select all images that failed to be transferred" is selected, the microcomputer 203 sets all images managed as having failed to be transferred, among all the images recorded on the recording medium 210, to the selected state. Thereafter, when the instruction to start transfer is received by the operation unit 209, the microcomputer 2003 starts the transfer of all images in the selected state.

The user may select images to be transferred one by one. For example, the next image and the previous image in the recording medium 210 may be read and displayed in accordance with the pressing of buttons for a next page and a previous page provided on the operation unit 209 on the screen of FIG. 3A, and the image to be transferred may be selected by pressing the selection button, and Finally, the transfer of the selected image may be started by pressing the start transfer button provided on the operation unit 209. When the screen is sufficiently wide, a thumbnail list of a plurality of images may be displayed so that the user can freely select images.

Several image transfer management methods can be considered. For example, in association with the file name of the image, transfer management information for storing and managing information of "selected", "waiting for transfer", "transfer in progress", "transfer completed", "waiting for re-transfer", and "transfer failed" is held as a hidden file in the recording medium 210. Alternatively, similar information is held in the nonvolatile memory 205. Alternatively, transfer management information may be held within each image file as meta information. In any case, every time the transfer processing is performed, the microcomputer 203 may update the information. However, when a new image file is recorded on the recording medium 210 by image capturing, information relating to transfer management of the image file may be distinguished as blank, unselected, or the like.

Here, the setting of the transfer destination of the image will be described. The setting of the transfer destination is set by the microcomputer 203 in accordance with a user operation made using the display unit 208 and the operation unit 209, and the setting content is held in the nonvolatile memory 205. The screen 500 in FIG. 5 is an example of a display for this purpose. In the present embodiment, it is assumed that one of a plurality of transfer destinations can be selected and that these can be switched.

For example, the transfer destination of Set1 is "FTPServer_A" as a FTP server, and a wired LAN is set as a transfer unit at that time. Furthermore, the connection between the image capturing apparatus and the FTP server is via an "XXX" access point. For Set2 to Set4, the settings are as shown respectively. Also, the menu item "wireless communication setting initialization" is used when the communication function setting is to be initialized. The setting for connection with the FTP server and the initialization method are not particularly limited.

Figure 1B:
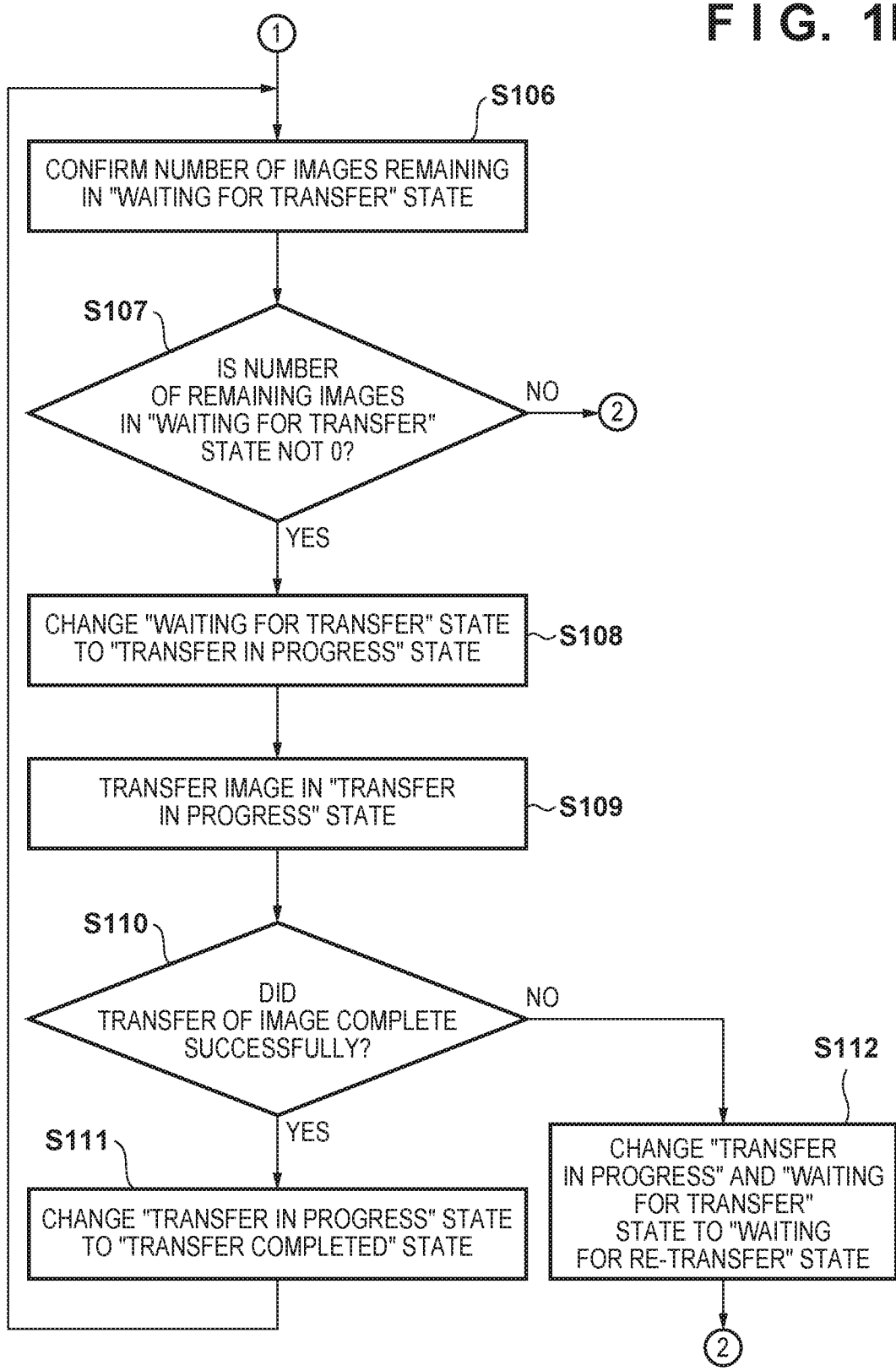

Next, the transfer processing by the microcomputer 203 in the embodiment will be described with reference to FIGS. 1A and 1B.

In the following description, it is assumed that the recording medium 210 stores three image files ("IMG_0001.jpg", "IMG_0002.jpg" and "IMG_0003.jpg"), all of which are already selected as transfer targets. FIG. 4A shows the transfer management information in this state. This information is created by the microcomputer 203 when the user selects these three files as transfer targets. At this stage, it is assumed that the transfer destination indicated by Set1 shown in FIG. 5 has been selected by the user. It is assumed that the information on the transfer destination is stored in the nonvolatile memory 204.

In step S100, the microcomputer 203 determines whether or not a shutdown instruction has been inputted via the operation unit 209. In order to save power, it may also be determined in step S100 whether or not a preset period has elapsed without any operation.

In step S100, when the microcomputer 203 determines "YES", it controls the power control circuit (not shown), and the process transitions the power supply of the device into the off state. When the power is returned from off to on, the state returns to step S100 state. At this time, the transfer management state is maintained.

In step S100, when the microcomputer 203 determines "NO", the process proceeds to step S101. In step S101, the microcomputer 203 confirms the transfer destination or the route of the image. The current setting is Set1 in FIG. 5.

In step S102, the microcomputer 203 determines whether the transfer destination of the image was changed. It has not been changed from Set1 since this process was started. Therefore, the microcomputer 203 determines that the transfer destination of the image has not changed, and advances the process to step S103.

When the transfer destination is set, information indicating the transfer destination (e.g., "Set1") is stored in the nonvolatile memory 205. When an instruction to initialize (cancel) the setting of the transfer destination is issued, the information indicating the transfer destination stored in the nonvolatile memory 205 is cleared. Therefore, when the user selects Set1 and the corresponding region of the nonvolatile memory 205 is blank, it can be determined that a new transfer destination is set. Then, in the case of setting a new transfer destination, the microcomputer 203 determines that there is no destination change. In information indicating the transfer destination stored in the nonvolatile memory 205, information indicating that the transfer processing has been performed is also stored (for example, the date and time), regardless of whether the transfer has succeeded or failed. This is for determining that a mere operation for changing the destination performed without having performed a transfer process even once is not a change to the destination in a previous transfer process.

In step S103, the microcomputer 203 determines whether the image is in a "waiting for re-transfer" state.

In the embodiment, as shown in FIG. 4A, since all three images are currently in the "selected" state, the microcomputer 203 determines "NO" in step S103, and advances the process to step S104.

In step S104, the microcomputer 203 determines whether there is a start transfer request. As for the start transfer request, it is assumed that the start transfer button 303 in FIG. 3C is selected (or touch operation is made) or a start transfer button provided on the operation unit 209 is pressed. If the microcomputer 203 determines in step S104 that there is no start transfer request, the microcomputer 203 returns the process to step S100 and repeats steps S100 to S104. If there is no operation even after a predetermined period of time has elapsed, the microcomputer 203 determines "YES" in step S1001 and turns off the power supply of the image capturing apparatus.

In step S104, when the microcomputer 203 determines that there is a transfer request, the process proceeds to step S105. In step S105, the microcomputer 203 changes the management information of the three images in the transfer management information from the "selected" state to the "waiting for transfer" state. In the embodiment, since the three image files are in the "selected" state, the microcomputer 203 changes the state of "IMG_0001.jpg", "IMG_0002.jpg", and "IMG_0003.jpg" from the "selected" state to the "waiting for transfer" state. FIG. 4B shows the transfer management information after this change.

In step S106, the microcomputer 203 confirms the number of images remaining in the "waiting for transfer" state. In the case of the embodiment, "3" is set. Next, in step S107, the microcomputer 203 confirms whether an image remains in the "waiting for transfer" state. When there are no images in the "waiting for transfer" state, that is, when all images have been transferred, the process returns to step S100. Here, since it is determined that the number of images waiting for transfer is "3", the determination of step S107 is "YES", and the microcomputer 203 advances the process to step S108.

In step S108, the microcomputer 203 changes the "waiting for transfer" state to the "transfer in progress" state for one image for which to start transfer. Since image transfer is performed one by one, the microcomputer 203 changes the state of the leading "IMG-0001.jpg" in the transfer management information to the "transfer in progress" state. FIG. 4C shows the transfer management information at that time.

In step S109, the microcomputer 203 executes transferring of the image in the "transfer in progress" state, that is, the file "IMG-0001.jpg" to the transfer destination via the communication unit 207.

In step S110, the microcomputer 203 checks whether or not the file "IMG-0001.jpg" has been successfully transferred. If the transfer is successful, the microcomputer 203 changes the "transfer in progress" state of "IMG-0001.jpg" in the transfer management information to the "transfer completed" state. FIG. 4D shows the transfer management information at that time.

When the processing returns to step S106, the microcomputer 203 again confirms the number of images remaining in the "waiting for transfer" state. Since this is "2" in the present embodiment, the determination of step S107 is "YES" and the process proceeds to step S108. In step S108, the microcomputer 203 changes the "waiting for transfer" state to the "transfer in progress" state for the image for which to start transfer. Here, "IMG_0002.jpg" is set to the "transfer in progress" state. FIG. 4E shows the transfer management information at that time.

Then, in step S109, the microcomputer 203 starts transferring the file "IMG-0002.jpg". Assume that, when an attempt to transfer an image was made via the communication unit 207 in step S109, the image could not be transferred due to a network error. For example, when the network is disconnected, such as when an abnormality occurs in an access point existing between the communication unit 207 and an FTP server in the connection on the network, the image cannot be transferred. In the present embodiment, the details of the network error will not be described, but various situations are envisioned. Thus when a transfer is not successful, the microcomputer 203, in step S110, determines that the transfer of the image is not performed successfully ("NO" is determined), the process proceeds to step S112.

In step S112, the microcomputer 203 changes the "transfer in progress" state or the "waiting for transfer" state in the transfer management information to the "waiting for re-transfer" state to set a re-transfer target. The "transfer in progress" state is changed to the "waiting for re-transfer" state because the image being transferred was not be transferred successfully. The "waiting for transfer" state is changed to the "waiting for re-transfer" state because the user selected the image and tried to transfer it. Since the transfer failed due to an error during the transfer of the file "IMG-0002.jpg", the state of the file and the state of "IMG-0003.jpg" to be transferred thereafter are set to the "waiting for re-transfer" state. FIG. 4F shows the transfer management information at that time. After completing step S112 processing, the microcomputer 203 returns the processing to step S100.

Below, a process for automatically transferring an image waiting for re-transfer when the power is turned from off to on in the above situation will be described. It should be noted that since the transfer management information is stored in the nonvolatile memory or the recording medium 210, which is also a type of nonvolatile memory, as described above, the state of FIG. 4F is maintained.

In step S100, regarding the microcomputer 203, when it is determined that the shutdown is performed, the image capturing apparatus enters a powered off state. When the power is turned from off to on, the state of step S100 is entered. The image transfer destination or route is confirmed in step S101. Since the image transfer destination has not been changed from Set1 after this process is started, it is determined in step S102 that the image transfer destination has not been changed, and the process advances to step S103. In step S103, the microcomputer 203 checks whether or not there are images in the transfer management information in the "waiting for re-transfer" state. As described above, since "IMG_0002.jpg" and "IMG_0003.jpg" are in the "waiting for re-transfer" state, the microcomputer 203 in step S103 determines "YES", and advances the process to step S113.

In step S113, the microcomputer 203 detects that the network state is a normal state via the communication unit 207. As a result of detecting the network state via the communication unit 207 in step S113, the microcomputer 203 determines whether or not the network state is normal in step S114. If the network error state has not been recovered from and the network error state persists, the microcomputer 203 returns the processing to step S100, and repeats the above-described processing. On the other hand, when a recovery has been made from the network error n step S114 and it is possible to successfully transfer an image, the microcomputer 203 causes the process to proceed to step S115.

In step S115, the microcomputer 203 changes "waiting for re-transfer" state to the "waiting for transfer" state in the transfer management information. Here, the "waiting for re-transfer" state of "IMG_0002.jpg" and "IMG_0003.jpg" is changed to the "waiting for transfer" state. FIG. 4G shows the transfer management information after the change process of step S115. Thereafter, the microcomputer 203 advances the process to step S106.

In step S106, regarding the microcomputer 203, as in the case of transferring "IMG_0001.jpg,", "IMG_0002.jpg" and "IMG_0003.jpg" are transferred, and when the transfer of all images is completed, both "IMG_0002.jpg" and "IMG_0003.jpg" enter the "transfer completed" state. FIG. 4H shows the transfer management information at that time.

Next, a process performed when the transfer destination of the image is confirmed in step S101 and the image transfer destination is changed in step S102 will be described.

Explanation is given of a case in which the current setting is Set1 in FIG. 5, and the user changes Set1 to Set2-Set4. In addition, the transfer management information at this stage will be described assuming the state of FIG. 4F.

Information that Set1 (FTPServer_A) has been selected in the previous transfer is stored and held in the nonvolatile memory 205. If the user selects Set2 ("FTPServer_B" as a FTP server) this time, the FTP servers of the two transfer destinations differ from each other, so that it can be determined that the transfer destination has changed.

As described above, the microcomputer 203 in step S102 determines that the transfer destination was changed ("YES" is determined), and the process is advanced to step S116.

In step S116, the microcomputer 203 changes the transfer management information from the "waiting for re-transfer" state to the "transfer failed" state (cancels the re-transfer target state). Here, the "waiting for re-transfer" state of "IMG_0002.jpg" and "IMG_0003.jpg" is changed to the "transfer failed" state. FIG. 4I shows the transfer management information at that time. By setting the "waiting for re-transfer" state to the "transfer failed" state in step S116, control can be performed so that images are not transferred to an FTP server that the user did not intend to transfer to. Note that no particular control is performed with respect to the image in the "selected" state. Since the image is simply selected to transfer the image, and no "start transfer" instruction is given, if the "selected" state is changed to "transfer failed", it may introduce a usability deterioration. In addition, a file for which "transfer failed" does not become a transfer target unless it is "selected" again as a transfer target by the user.

Next, a case in which Set1 is changed to Set3 will be described. In Set3, the transfer destination server is "FTPServer_A:", and setting is such that an image is transferred via the "XXX" access point in the wireless LAN, Comparing Set1 and Set3, although there is a difference in whether the communication medium is wired LAN or wireless LAN, the transfer destination is the same FTPServer_A. Therefore, in such cases, even if the menu for setting the transfer destination has been changed, since the transfer destination is the same "FTPServer_A", the microcomputer 203 determines that the transfer destination has not been changed in step S102 ("NO" is determined). Since it is a use case in which the user only wants to change the transfer medium, it is desirable to automatically re-transfer an image when a "waiting for re-transfer" image is present. Therefore, the same is true when Sell is changed to Set4. The difference between Set1 and Set4 is that the intervening access points are different ("XXX" and "YYY"), and the transfer destination is the same "FTPServer_A". Therefore, it is desirable to determine that the transfer destination has not been changed in step S102. However, when the setting related to the FTP transfer has been initialized by the "wireless communication setting initialization" or the like, it is not guaranteed which FTP server is set next, so it is desirable to determine in step S102 that the storage destination was changed and change the state to the "transfer failed" state.

Since the processing of steps S113, S114, and S115 is performed even in a state in which shut down is not performed in step S100, that is, when the image capturing apparatus maintains the power-on state, an image that failed to be transferred can be automatically re-transferred when image capturing apparatus recovers from the network error. In the present embodiment, it is possible to automatically re-transfer the image that failed to be transferred in either of the use cases after returning from powering off state to the power-on state.

In the embodiment, image transfer in a state in which the user has selected an image to be transferred using the display unit 208 and the operation unit 209 in advance has been described, but the control of the present invention can be applied even to a use case in which a captured image is automatically transferred. For example, assume that "automatic transfer at the time of capture" can be set to be on or off as a menu item (not shown) and "automatic transfer at the time of capture" is set to be on. In this case, when an image is captured, the microcomputer 203 automatically transfers the image to a connected FTP server. At this time, by managing the transfer management information of the image file immediately after imaging as the "waiting for transfer" state, it is possible to utilize the control as described in the present embodiment.

In the present embodiment, when the image transfer fails due to a network error or the like, it is possible to automatically re-transfer the image to the transfer destination intended by the user, and it is possible to improve user operability.

As described above, according to the present embodiment, data items that failed to be transferred to an external device for some reason can be re-transferred to an external device to which they were intended by the user to be transferred, and transfer to an external device to which the user did not intend them to be transferred can be suppressed.

Note that in the above embodiment which applies the invention to an image capturing apparatus, data items to be transferred are described as image files, but the data items to be transferred are not limited to this. In the embodiment, the communication protocol to be used is made to be FTP, and the transfer destination apparatus is an FTP server, but there is no particular limitation on the type of the communication protocol and the transfer destination apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-057090, filed Mar. 25, 2019, which is hereby incorporated by reference herein in its entirety.

What is claimed is:

1. A communication apparatus, comprising:
a communication unit configured to communicate with an external device via a network;
a storage unit configured to store a plurality of data items; and
at least one processor or circuit configured to function as:
a control unit configured to record transfer management information representing a state of a data item selected, from the plurality of data items stored in the storage unit, as a transfer target to be transferred to a transfer destination apparatus by the communication unit;
a setting unit configured to set at least one transfer destination apparatus, and
an initialization unit configured to initialize the setting by the setting unit,
wherein the control unit updates transfer management information in accordance with a process for transferring a data item,
wherein the control unit
for a data item that has failed to be transferred by the communication unit,
updates the transfer management information to a state indicating waiting for re-transfer in which, after recovery to a state in which transfer is possible, a re-transfer is performed by the communication unit to the transfer destination apparatus, and
when a transfer destination apparatus is changed after the update, updates the transfer management information so as to be changed from the state indicating waiting for re-transfer to a state indicating not to transfer; and
wherein, when the initialization is performed by the initialization unit, the control unit changes information indicating waiting for re-transfer to information indicating not to transfer in the transfer management information.

2. The apparatus according to claim 1, further comprising an image capturing unit and a recording unit configured to record image data obtained by the image capturing unit in the storage unit as the data item.

3. The apparatus according to claim 2, further comprising a display unit,
wherein, when the display unit displays the image data, the display unit displays a symbol in accordance with the transfer management information.

4. The apparatus according to claim 1, wherein, in a case where a network error occurs during transfer of a plurality of data items selected as transfer targets, the control unit changes transfer management information for a data item for which the transfer failed due to the occurrence of the network error and the data items waiting for transfer thereafter in information indicating waiting for re-transfer.

5. The apparatus according to claim 1, wherein the communication protocol used for communication between the communication unit and the external device is FTP (File Transfer Protocol).

6. A method for controlling a communication apparatus having a communication unit configured to communicate with an external device via a network and a storage unit configured to store a plurality of data items, the method comprising:
recording transfer management information representing a state of a data item selected, from the plurality of data items stored in the storage unit, as a transfer target to be transferred to a transfer destination apparatus by the communication unit;
setting at least one transfer destination apparatus; and
initializing the setting in the setting,
wherein, in the recording, the transfer management information is updated in accordance with a process for transferring a data item,
wherein in the recording, for a data item that has failed to be transferred by the communication unit, the transfer management information is updated to a state indicating waiting for re-transfer in which, after recovery to a state in which transfer is possible, a re-transfer is performed by the communication unit to the transfer destination apparatus, and
when a transfer destination apparatus is changed after the update, the transfer management information is updated so as to be changed from the state indicating waiting for re-transfer to a state indicating not to transfer, and
wherein, when the initializing is performed, in the recording, the information indicating waiting for re-transfer is changed to information indicating not to transfer in the transfer management information.

7. A non-transitory computer-readable storage medium storing a program which, when read and executed by a computer, causes the computer to execute the steps of a method for controlling a communication apparatus having a communication unit configured to communicate with an external device via a network and a storage unit configured to store a plurality of data items, the method comprising:
recording transfer management information representing a state of a data item selected, from the plurality of data items stored in the storage unit, as a transfer target to be transferred to a transfer destination apparatus by the communication unit;
setting at least one transfer destination apparatus; and
initializing the setting in the setting,
wherein, in the recording, the transfer management information is updated in accordance with a process for transferring a data item,
wherein in the recording, for a data item that has failed to be transferred by the communication unit, the transfer management information is updated to a state indicating waiting for re-transfer in which, after recovery to a state in which transfer is possible, a re-transfer is performed by the communication unit to the transfer destination apparatus, and
when a transfer destination apparatus is changed after the update, the transfer management information is updated so as to be changed from the state indicating waiting for re-transfer to a state indicating not to transfer, and
wherein, when the initializing is performed, in the recording, the information indicating waiting for re-transfer is changed to information indicating not to transfer in the transfer management information.

* * * * *